(12) United States Patent
Lanigan et al.

(10) Patent No.: US 12,566,136 B2
(45) Date of Patent: Mar. 3, 2026

(54) DETERMINATION OF A GEMSTONE'S COMPOSITION

(71) Applicant: De Beers UK Ltd, London (GB)

(72) Inventors: Peter Lanigan, Berkshire (GB); Colin McGuinness, London (GB)

(73) Assignee: De Beers UK Ltd, London (GB)

( * ) Notice: Subject to any disclaimer, the term of this patent is extended or adjusted under 35 U.S.C. 154(b) by 759 days.

(21) Appl. No.: 17/791,162

(22) PCT Filed: Jan. 6, 2021

(86) PCT No.: PCT/EP2021/050135
§ 371 (c)(1),
(2) Date: Jul. 6, 2022

(87) PCT Pub. No.: WO2021/140124
PCT Pub. Date: Jul. 15, 2021

(65) Prior Publication Data
US 2023/0028962 A1 Jan. 26, 2023

(30) Foreign Application Priority Data
Jan. 7, 2020 (GB) ..................................... 2000185

(51) Int. Cl.
*G01N 21/64* (2006.01)
*G01N 21/87* (2006.01)

(52) U.S. Cl.
CPC .............. *G01N 21/64* (2013.01); *G01N 21/87* (2013.01)

(58) Field of Classification Search
CPC ........ G01N 21/63; G01N 21/64; G01N 21/87; G01N 21/88; G01N 21/8806; G06Q 50/02; G06V 20/10; G06N 3/045

USPC ................ 436/5, 164, 172; 422/82.05, 82.08
See application file for complete search history.

(56) References Cited

U.S. PATENT DOCUMENTS

| | | | |
|---|---|---|---|
| 5,801,819 A | 9/1998 | Spear et al. | |
| 5,835,205 A | * 11/1998 | Hunter ................... | G01N 21/87 356/30 |
| 5,883,389 A | * 3/1999 | Spear ..................... | G01N 21/87 356/30 |
| 6,014,208 A | 1/2000 | Welbourn et al. | |

(Continued)

FOREIGN PATENT DOCUMENTS

| | | |
|---|---|---|
| CN | 102884419 A | 1/2013 |
| CN | 104822031 A | 8/2015 |

(Continued)

OTHER PUBLICATIONS

International Search Report and Written Opinion for Application No. PCT/EP2021/050135, mailed on Apr. 12, 2021, 14 pages.

(Continued)

*Primary Examiner* — Maureen Wallenhorst
(74) *Attorney, Agent, or Firm* — Sheppard Mullin Richter & Hampton LLP

(57) ABSTRACT

A method of determining the composition of a polished gemstone includes passing an excitation beam through the gemstone from a table facet substantially to a culet of the gemstone, an axis of the excitation beam being substantially perpendicular to the table facet; and capturing luminescence emitted by the gemstone from an angle oblique to the axis of the excitation beam.

18 Claims, 8 Drawing Sheets

(56) References Cited

U.S. PATENT DOCUMENTS

| | | | | |
|---|---|---|---|---|
| 6,020,954 | A * | 2/2000 | Aggarwal | G01N 21/87 |
| | | | | 356/30 |
| 6,239,867 | B1 | 5/2001 | Aggarwal | |
| 6,331,708 | B2 * | 12/2001 | Smith | G01N 21/87 |
| | | | | 250/483.1 |
| 9,176,068 | B1 | 11/2015 | Radomyshelsky et al. | |
| 2013/0301042 | A1 | 11/2013 | Urano et al. | |
| 2015/0222820 | A1 | 8/2015 | Costigan et al. | |
| 2017/0166474 | A1 | 6/2017 | Debbage et al. | |
| 2018/0172599 | A1 * | 6/2018 | Wang | G01N 21/87 |
| 2019/0219513 | A1 * | 7/2019 | Blank | G01N 21/63 |
| 2021/0156807 | A1 * | 5/2021 | Tsai | G01N 21/6456 |
| 2023/0027883 | A1 * | 1/2023 | Lanigan | G01N 21/87 |

FOREIGN PATENT DOCUMENTS

| | | | |
|---|---|---|---|
| CN | 105352929 | A | 2/2016 |
| CN | 106458712 | A | 2/2017 |
| EP | 1014438 | A2 | 6/2000 |
| GB | 2379732 | A | 3/2003 |
| WO | 99/57544 | A1 | 11/1999 |
| WO | 2003/023382 | A1 | 3/2003 |

OTHER PUBLICATIONS

Search Report for Application No. GB 2000185.5, mailed on Mar. 16, 2020, 4 pages.

International Preliminary Report on Patentability for Application No. PCT/EP2021/050135, mailed on Jul. 21, 2022, 9 pages.

First Examination Report for Chinese Application No. 202180018444. 6, mailed on Apr. 19, 2025, 16 pages.

First Examination Report dated Nov. 10, 2025, issued in Indian Patent Application No. 202227044741, with English machine translation (8 pages).

* cited by examiner

14

DETERMINATION OF A GEMSTONE'S COMPOSITION

This application is a national phase application of International Patent Application No. PCT/EP2021/050135, filed on Jan. 6, 2021, which is based on and claims priority to and benefits of British Patent Application No. 2000185.5, filed on Jan. 7, 2020. The entire content of all of the above-identified applications is incorporated herein by reference.

TECHNICAL FIELD

The present invention relates to a method of determining the composition of a polished gemstone. In particular, the method relates to determining whether a polished gemstone is a doublet.

BACKGROUND

A major concern in the gemstone (and in particular, the diamond) industry is the presence of undisclosed synthetics, including hybrid and doublet stones. A doublet is essentially a synthetic stone grown onto or otherwise attached to a natural cut stone. For example, as illustrated in FIGS. 1*a* and 1*b*, a natural stone pavilion 10 may be augmented by the addition of a synthetic stone—in this case, a chemical vapour deposition (CVD) crown 12—to form a composite, or doublet 14. In addition to a combination of a natural pavilion with a synthetic crown, as illustrated in FIG. 1*b*, doublets may also consist of a natural crown with a synthetic pavilion. The various elements of a cut gemstone (table, crown, girdle, pavilion, culet) are further illustrated in FIG. 1*c*. Typically, the table to girdle distance of a brilliant cut gemstone is approximately 25% of the total stone depth.

Augmenting a natural stone with a synthetic layer or overgrowth may be carried out to change the natural stone's colour (for example, to cause a colourless natural stone to appear blue by the addition of a boron-doped synthetic layer), or to exploit price breaks (for example, by bringing the natural stone's weight up to 0.5 or 1 carat). Doublets comprising a synthetic CVD overgrowth of 740 microns thickness have been reported.

The ability to identify diamonds which are pure synthetics has been largely addressed by the development of deep UV imaging instruments, such as DiamondView™ and Synth-Detect™, via knowledge of natural diamond signatures. The identification of doublets poses a greater challenge, however, since they may pass initial screening, and so may never be referred for testing by more advanced screening instruments. In particular, while fancy coloured (e.g. blue) stones could be referred to DiamondView for further testing, this is less likely to happen with colourless stones.

It would therefore be desirable to develop effective screening for doublets, in particular for type IIa/IaAB diamonds. Such screening would preferably detect synthetic material present on the crown or pavilion of the stone, and accommodate both loose and mounted stones.

SUMMARY OF INVENTION

In one aspect of the present invention there is provided a method of determining the composition of a polished gemstone. The method comprises passing an excitation beam through the gemstone from a table facet substantially to a culet of the gemstone, an axis of the excitation beam being substantially perpendicular to the table facet; and capturing luminescence emitted by the gemstone from an angle oblique to the axis of the excitation beam.

The luminescence may be captured in an image capture plane at a first angle oblique to an optical axis extending from the table facet of the gemstone to the image capture plane. The oblique angle may optionally be around 60° or 50°.

The method may comprise generating an axial profile of the luminescence properties of the gemstone.

The method may comprise determining whether the axial profile comprises one or more discontinuities, and where discontinuities are present, identifying the gemstone as a doublet.

The method may comprise capturing luminescence while moving the gemstone laterally relative to the beam.

The excitation beam may comprise a light sheet.

The excitation beam may have a wavelength of substantially 532 nm. Alternatively, the excitation beam may have a wavelength of substantially 405 nm.

The emitted luminescence may be fluorescence. Additionally or alternatively, the emitted luminescence may be phosphorescence.

The gemstone may be a diamond. The gemstone may be mounted in jewellery or the like.

According to another aspect of the present invention there is provided a method of determining whether a polished gemstone is a doublet. The method comprises exciting the gemstone to generate luminescence; capturing said luminescence at an angle oblique to an axis of excitation; generating an axial luminescence profile of the gemstone; and, where this profile comprises one or more discontinuities, identifying the gemstone as a doublet.

According to a further aspect of the invention there is provided an apparatus for determining the composition of a polished gemstone. The apparatus comprises an excitation source configured to illuminate the gemstone with an excitation beam via a table facet of the gemstone; and a capture device configured to capture luminescence emitted by the gemstone at an angle oblique to an axis of the excitation beam.

The apparatus may comprise a focussing system configured to focus luminescence emitted by the gemstone to produce an image at the capture device.

An image capture plane of the capture device may be at a first angle to an optical axis of said focussing system. The first angle may be substantially equal and opposite to a second angle between said optical axis and the axis of the excitation beam.

The focussing system may comprise one or more lenses.

The apparatus may comprise a lens configured to focus the excitation beam.

The apparatus may comprise a device configured to move the gemstone relative to the excitation beam.

The apparatus may comprise a processor coupled to the capture device and configured to generate an axial profile of the luminescence properties of the gemstone.

The image capture plane, optical axis, focussing system and excitation beam may be configured to enable Scheimpflug tomography.

The apparatus may comprise a processor configured to transform the luminescence captured by the capture device into an image, search for discontinuities in the image and, where such discontinuities are present, determine that the gemstone is a doublet.

DETAILED DESCRIPTION

Described herein is a method of determining the composition of a polished gemstone using Scheimpflug tomography (i.e. imaging the gemstone by sections). The method comprises passing an excitation beam through the polished gemstone from the table facet substantially down to the culet, and capturing luminescence emitted by the gemstone from an angle oblique to an axis of the excitation beam. The captured luminescence can be used to generate an axial cross-section of the luminescence properties of the gemstone.

The wavelength of the excitation beam may be selected to generate luminescence (i.e. fluorescence) from different gemstone point defects, e.g. N3 centres (three nitrogen atoms surrounding a vacancy) and/or NV centres (one substitutional nitrogen atom adjacent a vacancy). In one non-limiting example, the excitation beam may have a wavelength of substantially 532 nanometres (nm). Such a beam may be provided by a green laser, which may be used to excite centres expected in any CVD material that is present within the gemstone. In another non-limiting example, a violet laser (having a wavelength of around 360 nm-480 nm and preferably less than 415 nm, for example, 405 nm) may be used to excite the N3 defect present in most natural diamond stones. Alternatively or additionally, one or more images of the stone may be obtained using dual colour luminescence tomography.

Any luminescence generated by the excitation beam is captured at an angle to the beam direction (i.e. off-axis), in accordance with the Scheimpflug principle, wherein the illumination plane and the image plane are oblique to one another.

Scheimpflug techniques utilising light sheets are known in the field of corneal photography and fluorescence microscopy. Laser light sheets comprise a beam that is focused in one direction only using a lens. Advantages of Scheimpflug techniques may include: speed (photon efficient as light is only in the focal plane); multichannel (applicable to multispectral imaging); and cost (CMOS camera technology can be used to acquire images).

Scheimpflug techniques have an additional advantage in this context, in that imaging of mounted gemstones is possible, since the stone is "scanned" by the light beam or sheet from the table down to the pavilion, from above. It will be appreciated that it is not straight forward to collect light through the facets of cut and polished gemstones, such as diamonds, and impossible when the gemstone is mounted in jewellery (e.g. a ring, necklace, watch or the like), in which case the pavilion is typically inaccessible.

It will be understood that very short wavelength light (lower than about 225 nm) is strongly absorbed by diamond and will therefore not penetrate into the stone. Longer wavelengths of excitation are therefore required so that the light beam or sheet can penetrate all the way into the stone.

Figure 1A:
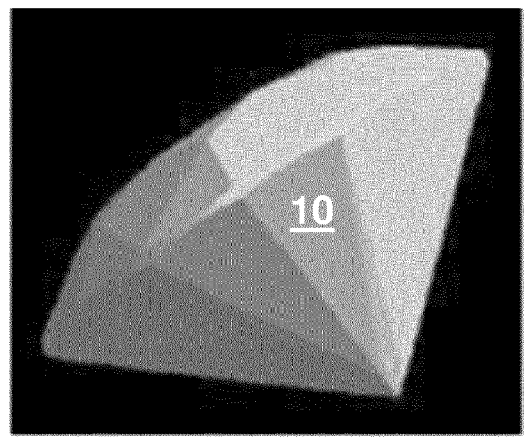
FIG. 1*a* illustrates a natural cut gemstone.
Figure 1B:
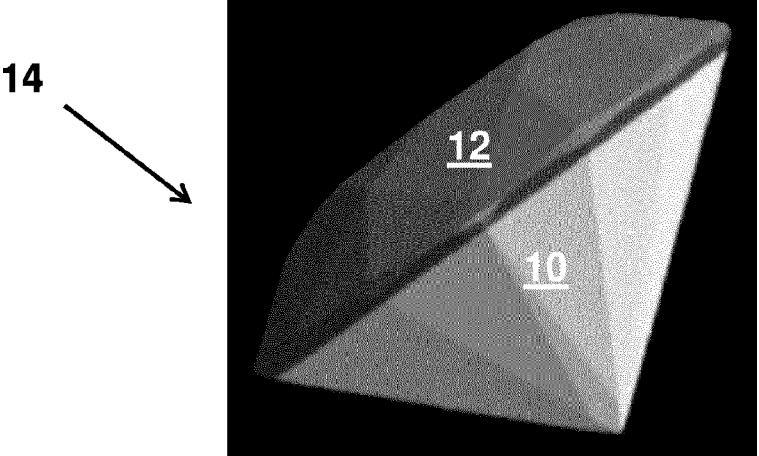
FIG. 1*b* illustrates a doublet.
Figure 1C:
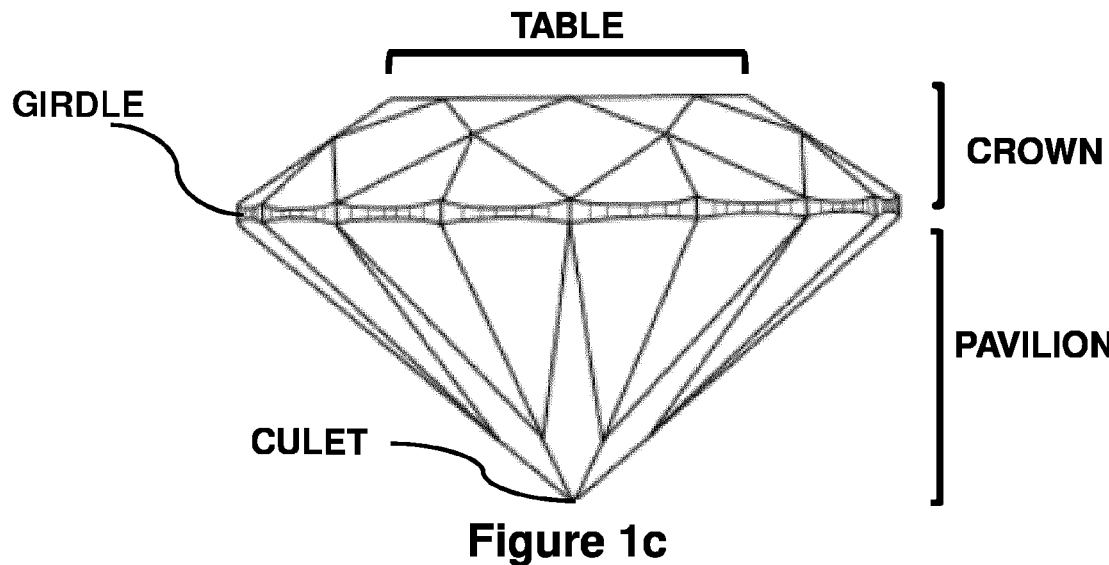
FIG. 1c illustrates aspects of a cut gemstone.
Figure 2:
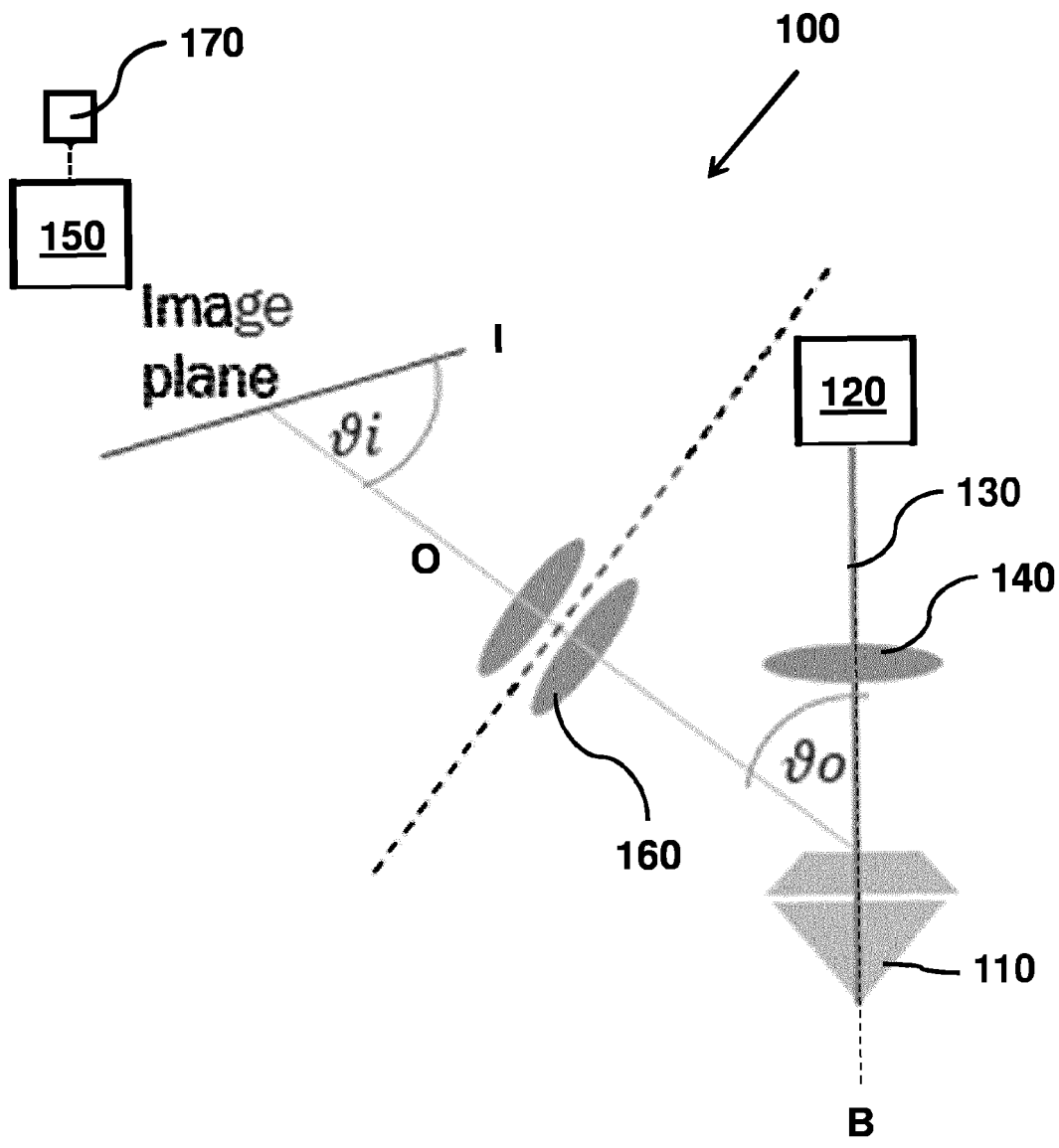
FIG. 2 is a schematic of an apparatus for determining the composition of a polished gemstone.

An exemplary apparatus 100 for carrying out the above method of determining the composition of a polished gemstone 110 is illustrated in FIG. 2. The apparatus 100 comprises a light source 120 configured to produce (in this example) a light beam (e.g. a 10 mW 532 nm Gaussian beam) 130 that is focusable using a first lens 140. The apparatus 100 further comprises a capture device 150 (for example, a CMOS device or sensor) configured to capture an image of the luminescence generated by the gemstone 110 via a pair of objective lenses 160 (for example, back-to-back 10×0.3NA objectives which gather light from the gemstone and focus that light to produce an image at the capture device 150). Optionally, the apparatus 100 may comprise a processor 170 linked to the capture device 150. Alternatively or additionally, the apparatus 100 may comprise dual wavelength illumination.

As illustrated in FIG. 2, the pair of objective lenses 160 generate an image of the gemstone 110 at the capture device 150. The optical axis O is at an angle $\vartheta o$ to the light beam axis B, while the image plane I is at a similar but opposite angle $\vartheta i$ to the optical axis, following the Scheimpflug principle, in which:

$$\vartheta i = \vartheta o / M, \text{ where } M = \text{magnification.}$$

In the non-limiting example of FIG. 2, M=x1, and $\vartheta i = \vartheta o$ (~60 degrees). The light beam waist (i.e. the beam size at the point of its focus) is approximately F #16 (i.e. approximately 16 μm). The z-resolution is approximately 54 μm due to the 60 degree angle, and the refractive index of the gemstone is n=2.4. At an angle of 60 degrees, approximately ⅔ of the gemstone's depth from the table downwards may be imaged. For full depth imaging, from table facet to culet, the angle (i.e. $\vartheta i$, $\vartheta o$) is approximately 50 degrees.

Figure 3:
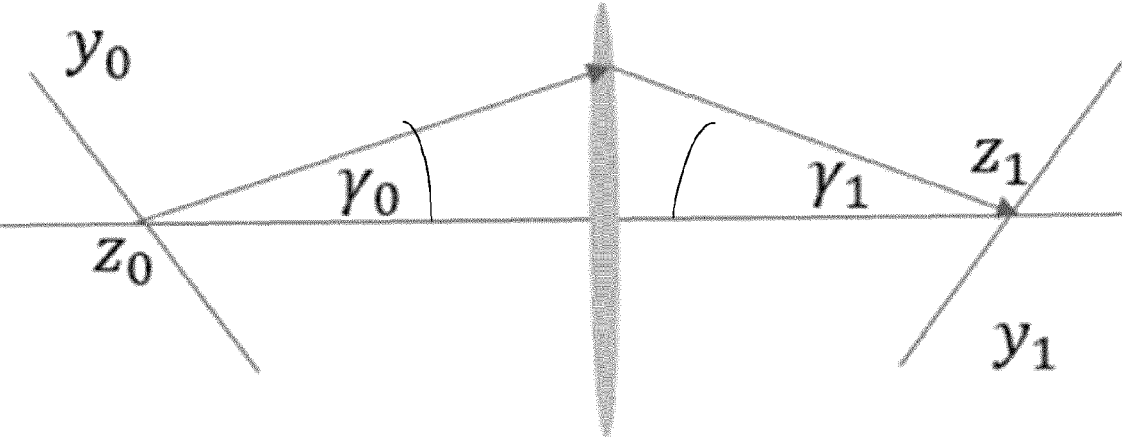
FIG. 3 illustrates optical conditions to be satisfied.

In general, known microscope and camera lenses are designed to closely follow the well-known Abbe sine condition, and therefore produce a lateral 2D image close to the diffraction limit. Referring to FIG. 3, the Abbe sine condition is as follows:

$$y_0 n_0 \sin \gamma_0 = y_1 n_1 \sin \gamma_1$$

where $n_0$ and $n_1$ refer to the object and image immersion medium (in practice, both air). However, to produce a similar aberration-free image along the optical axis of the lens the Hershel condition also needs to be satisfied:

$$z_0 n_0 \sin(\gamma_0/2)^2 = z_1 n_1 \sin(\gamma_1/2)^2$$

For both conditions to be met the magnification requirement is $n_{image}/n_{object}$, and magnification must satisfy:

$$\gamma_0 = \gamma_1$$

Therefore, the magnification of the imaging is set at 1 (i.e. M=x1) but in practice is de-magnified via the refractive index of the gemstone, n=2.4. In other words, apparent depth scales the profile at the capture device by $1/n = 1/2.4$ For dry objectives (i.e. operating through air), magnification (m)=1, and $m = y_1/y_0 = z_1/z_0 = n_0/n_1$ The apparatus 100 described above generates an image that is an axial profile of the luminescence properties of the gemstone 110, and represents a function of the gemstone's 110 material composition. In this way, different material layers within the gemstone 110 may be identified.

Initial alignment of the gemstone 110 with the components of the apparatus 100 can be made by bright field reflected light imaging, as well as determination of the location of the back and front of the stone. Perpendicular alignment of the gemstone 110 table facet with the beam axis can be made by retro-reflecting a beam from the gemstone 110 table onto a quadrant diode, or by using a similar method. Alignment of the gemstone 110 may be necessary in order to accurately determine the origin of any detected luminescence.

Figure 4A:
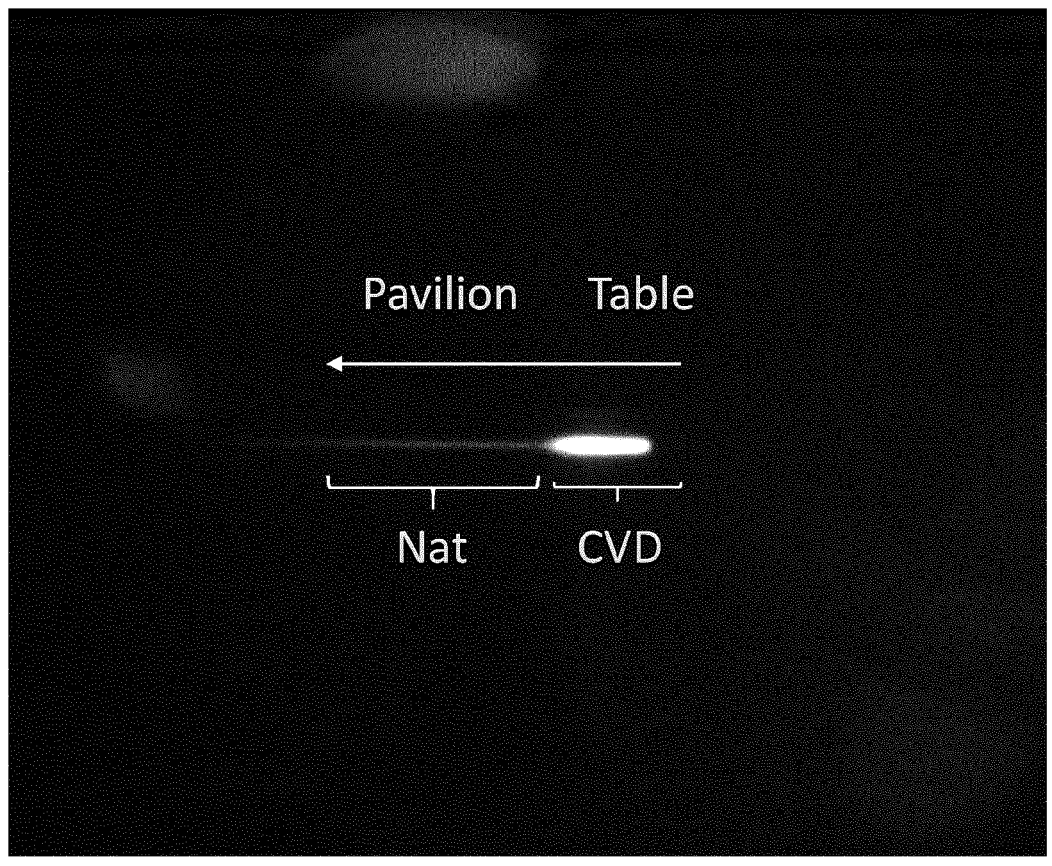
FIGS. 4a and 4b illustrate a luminescence profile of a first gemstone.
Figure 4A:
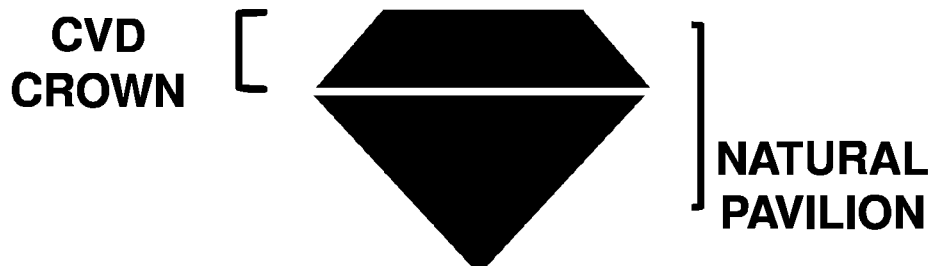

FIG. 4a illustrates a luminescence line profile/single depth profile through the stone captured by apparatus 100, under excitation at around 532 nm, illustrating the luminescence (fluorescence) spatial distribution for an acquisition time of 16 ms of a first, 1.3 carat diamond gemstone. The distribution indicates a difference or discontinuity in the luminescence properties of the table (crown) and pavilion of the gemstone, i.e. the crown luminesces (fluoresces) to a greater extent than the pavilion. This change in luminescence properties from the table to the pavilion indicates that the imaged gemstone is a doublet, in this case comprising a standard purity CVD table, and a natural diamond pavilion.

Figure 4B:
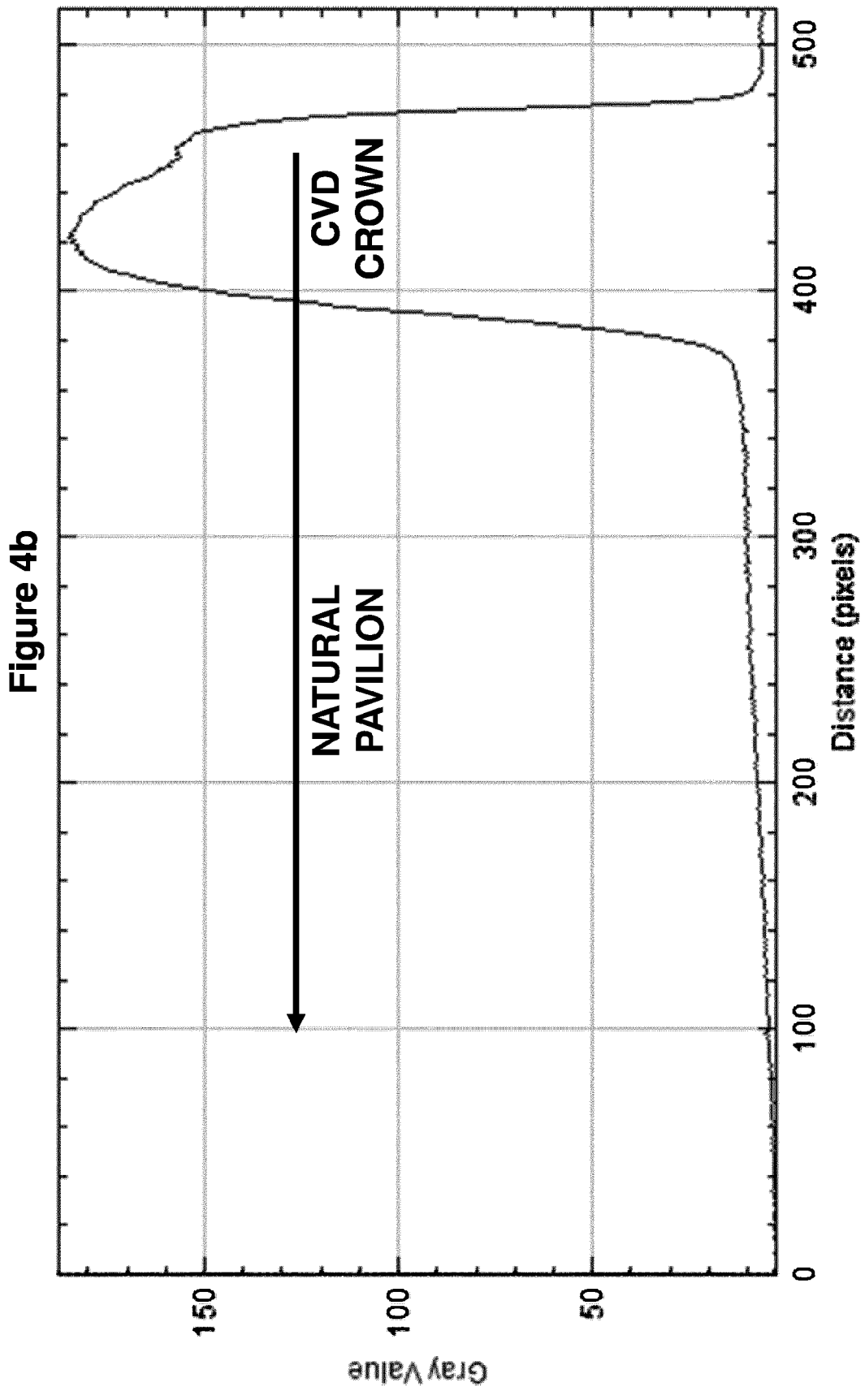

FIG. 4b illustrates graphically the axial luminescence profile of the gemstone of FIG. 4a, from the table to the pavilion.

Figure 5A:
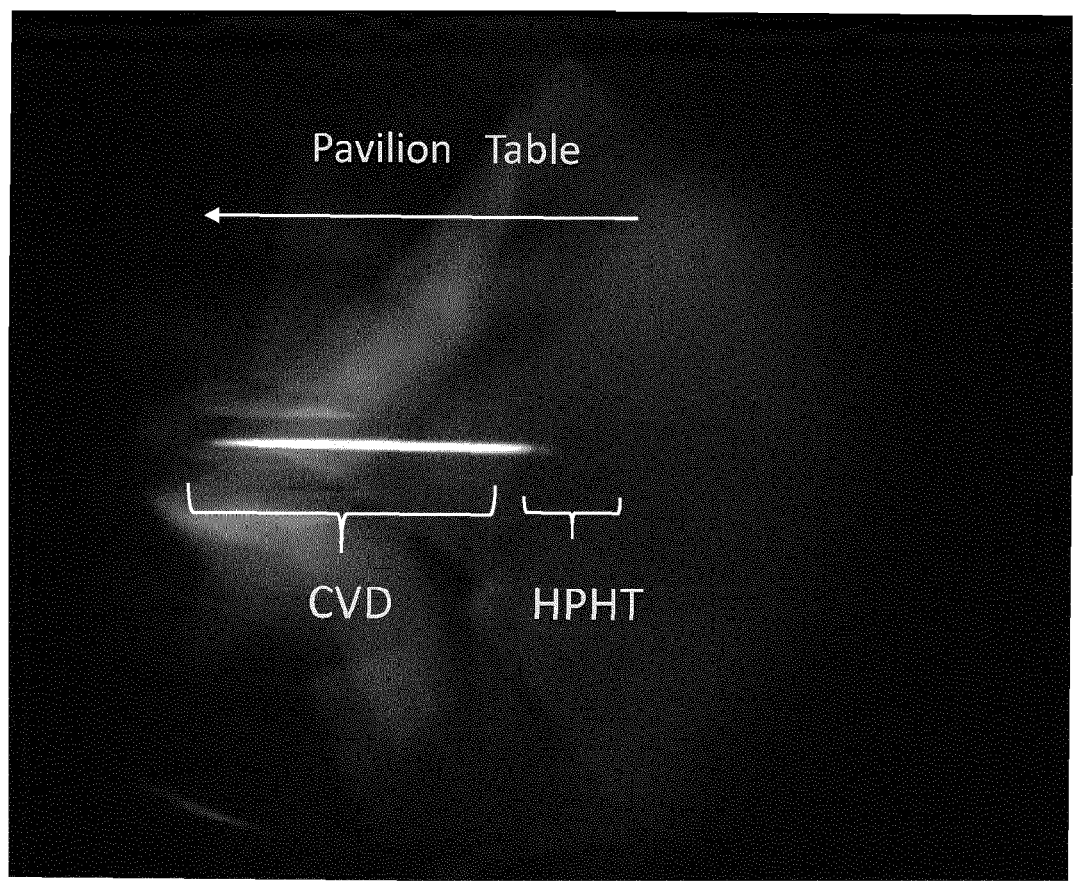
FIGS. 5a and 5b illustrate a luminescence profile of a second gemstone.
Figure 5A:
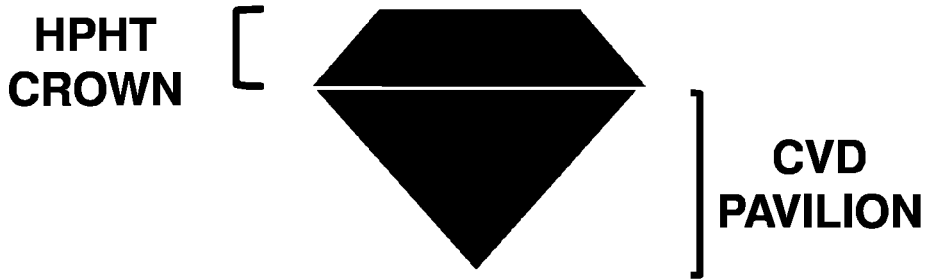

FIG. 5a illustrates a luminescence line profile/single depth profile through the stone captured by apparatus 100, illustrating the luminescence (fluorescence) spatial distribution for an acquisition time of 16 ms of a second diamond gemstone under 532 nm excitation. The distribution indicates a difference or discontinuity in the luminescence properties of the crown and pavilion of the gemstone, i.e. the pavilion luminesces (fluoresces) to a greater extent than the crown. This change in luminescence properties from the table to the pavilion indicates that the imaged gemstone is a doublet, in this case comprising a standard purity CVD synthetic pavilion, and an HPHT (high pressure high temperature) synthetic crown.

Figure 5B:
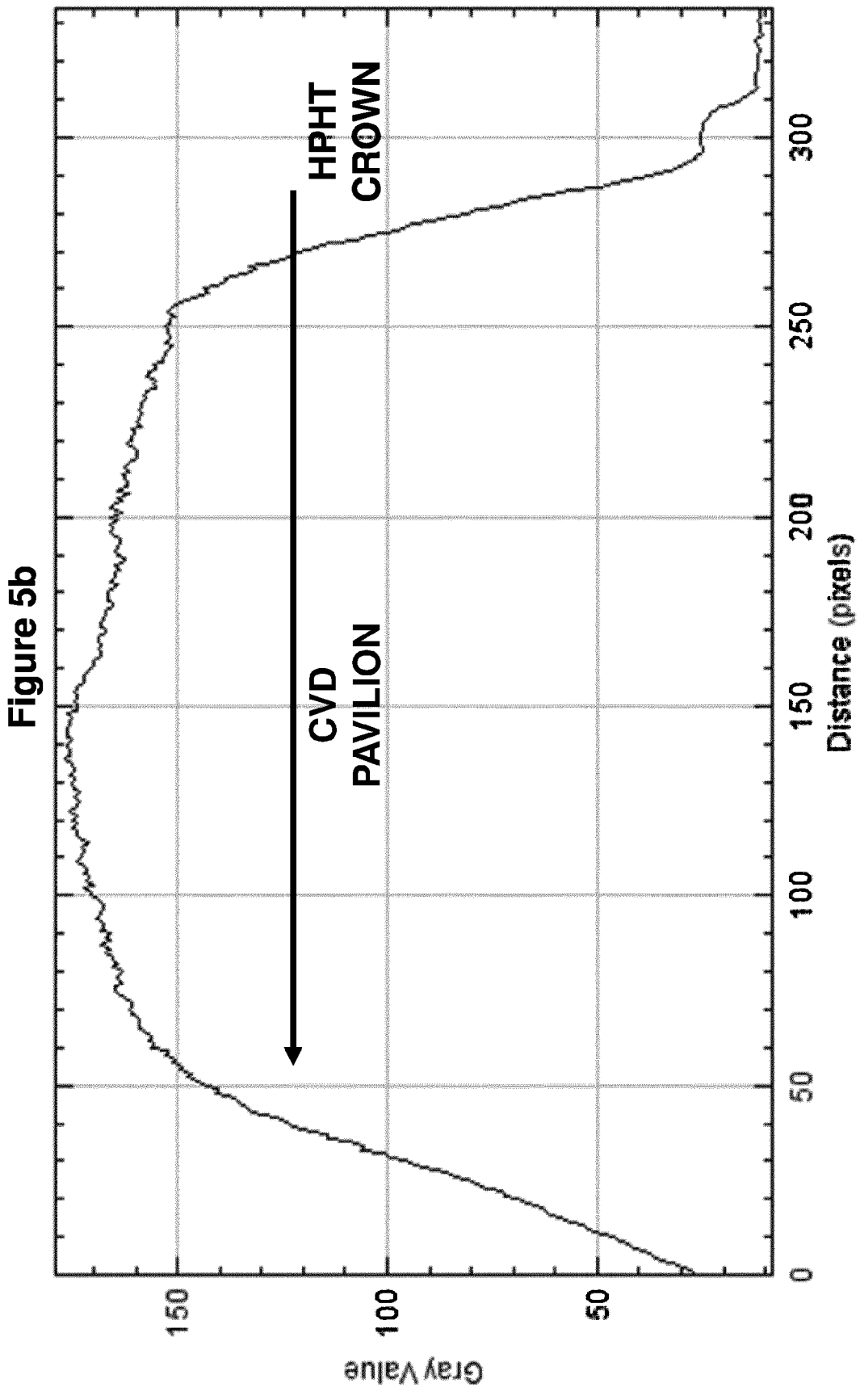

FIG. 5b illustrates graphically the axial luminescence profile of the gemstone of FIG. 5a, from the table to the pavilion.

A 2D tomograph (i.e. a slice) of the gemstone 110 can be obtained via beam scanning, by light sheet generation, by moving the gemstone with respect to the beam/light sheet, or combinations thereof. In order to achieve this, an x,y,z manipulation device (not shown here) may be included in the above-mentioned apparatus 100, which moves the stone laterally with respect to the beam. Alternatively, the device may be used to move the beam across the stationary stone. Using a beam, two dimensions need to be scanned, whereas one dimension is scanned with a light sheet.

Figure 6:
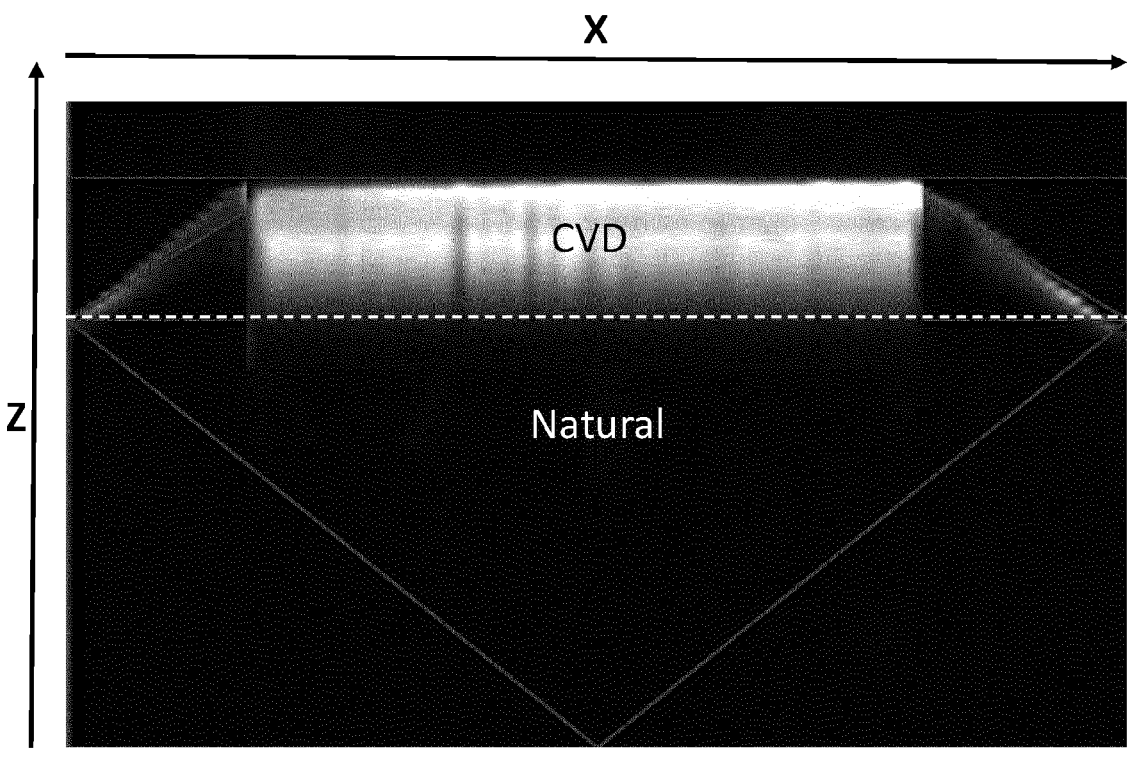
FIG. 6 illustrates a tomograph of a further gemstone.
Figure 6:
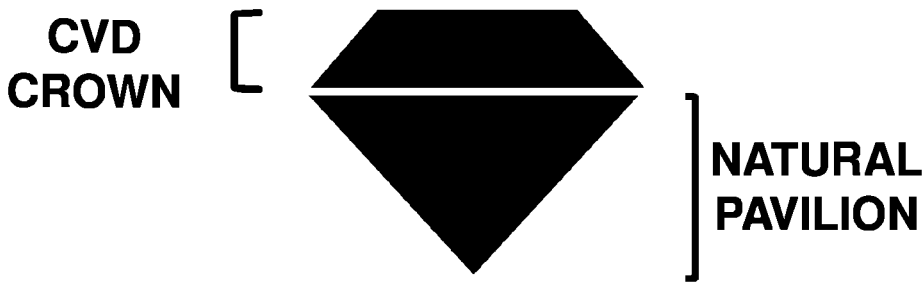

A tomograph of a further diamond gemstone, having a CVD crown and natural pavilion is illustrated in FIG. 6. In contrast to the luminescence profiles illustrated in FIGS. 4a and 5a above, the profile of FIG. 6 is generated via beam scanning i.e. moving the beam laterally along a line parallel with the table facet of the gemstone. This produces an image of the luminescence produced under excitation from a "slice" of the stone. The same result can be achieved using a laser light sheet instead scanning of a beam. As illustrated, the gemstone comprises a CVD (synthetic) crown which fluoresces under excitation, and a natural pavilion which does not fluoresce.

Thus the tomograph illustrated in FIG. 6 reveals a discontinuity in the luminescence properties of the gemstone, indicating that the gemstone comprises layers of different materials (in other words, that the gemstone is non-homogeneous and is formed from two or more different materials). The boundary or interface between luminescing/non-luminescing regions of the stone is substantially parallel with the table facet. The interface could be in the pavilion, girdle or crown.

A full 3D map and/or model of the gemstone may optionally be obtained by rotating the gemstone 110 about its central axis for sheet illumination, or for single spot illumination synchronising the scanning of the beam and objective together. Once multiple 2D images of the stone have been obtained, optionally using multiple image capture devices, these 2D images may be combined using the processor to generate a 3D model of the stone. Alternatively or additionally, the processor may carry out image processing on the obtained 2D images to clean up and/or highlight areas of the image, and/or fit the image shape to a known shape of the gemstone.

As used herein, fluorescence is a type of luminescence characterised as only being produced when the excitation is on. Phosphorescence is a type of luminescence that remains but decays away once the excitation is removed.

As used herein, natural is defined as a stone from nature consisting exclusively of diamond produced by geological processes. The term natural, as defined herein, indicates that the stone is not synthetic, but does not exclude the possibility that the stone could have been treated, for example by pressure or heat treatment, unless specifically stated.

As used herein, synthetic is defined as man-made material consisting exclusively of diamond produced by artificial or industrial processes, such as chemical vapour deposition or high pressure high temperature processes.

As used herein, treated is defined as natural material (as defined above) which has been modified in order to improve its colour or clarity, for example by chemical or mechanical means, by irradiation or by pressure or heat treatments.

The invention claimed is:

1. A method of determining a composition of a polished gemstone, the method comprising:

passing an excitation beam through the gemstone from a table facet substantially to a culet of the gemstone, an axis of the excitation beam being substantially perpendicular to the table facet; and capturing luminescence emitted by the gemstone from an angle oblique to the axis of the excitation beam, wherein the luminescence is captured in an image capture plane at a first angle oblique to an optical axis extending from the table facet of the gemstone to the image capture plane.

2. The method as claimed in claim 1, further comprising generating an axial profile of luminescence properties of the gemstone.

3. The method as claimed in claim 2, further comprising determining whether the axial profile comprises one or more discontinuities, and where discontinuities are present, identifying the gemstone as a doublet.

4. The method as claimed in claim 1, further comprising capturing luminescence while moving the gemstone laterally relative to the beam.

5. The method as claimed in claim 1, wherein the excitation beam comprises a light sheet.

6. The method as claimed in claim 1, wherein the excitation beam has a wavelength of substantially 532 nm.

7. The method as claimed in claim 1, wherein the excitation beam has a wavelength of substantially 405 nm.

8. The method as claimed in claim 1, wherein the emitted luminescence is fluorescence.

9. The method as claimed in claim 1, wherein the gemstone is a diamond.

10. The method as claimed in claim 1, wherein the gemstone is mounted in jewellery.

11. An apparatus for determining a composition of a polished gemstone, the apparatus comprising:

an excitation source configured to illuminate the gemstone with an excitation beam via a table facet of the gemstone;

a capture device configured to capture luminescence emitted by the gemstone at an angle oblique to an axis of the excitation beam;

said excitation beam passing through the gemstone from the table facet substantially to a culet of the gemstone, an axis of the excitation beam being substantially perpendicular to the table facet; and a focusing system configured to focus luminescence emitted by the gemstone to produce an image at the capture device, wherein an image capture plane of the capture device is at a first angle oblique to an optical axis of said focusing system, which extends from the table facet of the gemstone to the image capture plane.

12. The apparatus as claimed in claim 11, wherein the first angle is substantially equal and opposite to a second angle between said optical axis and the axis of the excitation beam.

13. The apparatus as claimed in claim 11, wherein the focussing system comprises one or more lenses.

14. The apparatus as claimed in claim 11, further comprising a lens configured to focus the excitation beam.

15. The apparatus as claimed in claim 11, further comprising a device configured to move the gemstone relative to the excitation beam.

16. The apparatus as claimed in claim 11, further comprising a processor coupled to the capture device and configured to generate an axial profile of luminescence properties of the gemstone.

17. The apparatus as claimed in claim 11, where the image capture plane, the optical axis, the focussing system and the excitation beam are configured to enable Scheimpflug tomography.

18. The apparatus as claimed in claim 11, further comprising a processor configured to transform the luminescence captured by the capture device into an image, search for discontinuities in the image and, where such discontinuities are present, determine that the gemstone is a doublet.

* * * * *